Jan. 30, 1934. J. C. MARTIN, JR Re. 19,068

PLUG COCK

Original Filed Feb. 5, 1921 2 Sheets-Sheet 1

Inventor:

Jesse C. Martin Jr

Brauner & Shelf

Jan. 30, 1934. J. C. MARTIN, JR Re. 19,068

PLUG COCK

Original Filed Feb. 5, 1921 2 Sheets-Sheet 2

Jesse C. Martin Jr.
INVENTOR.

BY Albert J. Henderson
ATTORNEY.

Reissued Jan. 30, 1934

Re. 19,068

UNITED STATES PATENT OFFICE 19,068

PLUG COCK

Jesse C. Martin, Jr., San Francisco, Calif., assignor to Walworth Patents Inc., Boston, Mass., a corporation of Massachusetts Original No. 1,416,732, dated May 23, 1922, Serial No. 442,862, February 5, 1921. Application for reissue August 31, 1923. Serial No. 660,453

11 Claims. (Cl. 251—93)

The hereinafter described invention relates to closures in pipe lines for stopping or throttling the fluid flow therethrough embodying constructive improvements over my United States Letters Patent No. 1,365,116, entitled "Plug cocks", issued January 11th, 1921.

One of the objects of the invention is to provide better means for introducing and retaining the lubricant forced under high pressure between the plug and plug seat surfaces so that, after the lubricant is introduced through the inlet and communicating ports provided for its movement, it will not pass back and waste out of the inlet due to the pressure built up in the ports when it is forced in, nor will the fluid pressure in the cock be permitted to pass through the inlet upon dissipation of the lubricant it being desirable that both lubricant and fluid pressure, so far as possible, be retained in the lubricant ducts or passages so as to automatically continue the lubricant advance to the plug and plug seat surfaces after the grease gun is removed and to prevent leakage during a lubricant filling operation, and in the accomplishment of this, I provide a check valve controlled lubricant inlet which will prevent the lubricant exit or pressure of the fluid flow in the cock therethrough.

A further object of the invention is to provide a diaphragm between the end of the plug and the plate affixed to the casing which will form a tight joint between the casing and plate, as well as a movable tight joint between the diaphragm and the end of the plug, thereby effectively serving to keep the lubricant pressure up within the valve by checking its passage in this direction, as well as stopping any fluid pressure escapement to the atmosphere by the end of the plug, the constancy of the movable tight joint being assured by a resilient member which presses the diaphragm against the joint surface on the plug, automatically compensating for any wear, as well as eliminating the use of a gland and stuffing box which has to be periodically screwed up and repacked, and owing to the inaccessible places where these valves are installed such packing is frequently neglected, detracting materially from the general efficiency of the valve.

For the purpose of better understanding the invention, reference is hereby made to the accompanying drawings, in which—

Figure 1:
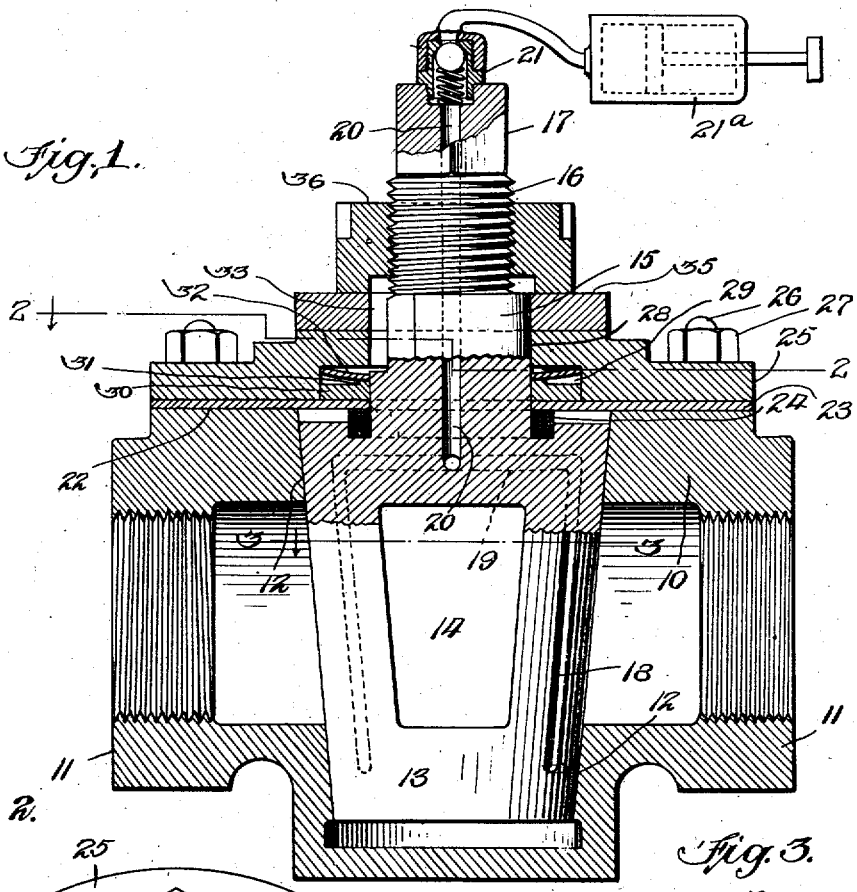
Fig. 1 is a vertical section taken through the center of a plug cock of my improved construction.
Figure 2:
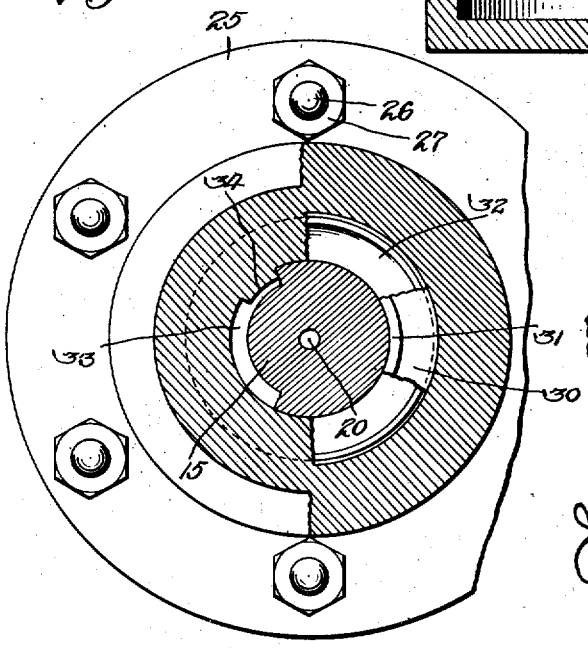
Fig. 2 is a horizontal section taken approximately on the line 2—2 of Fig. 1.
Figure 3:
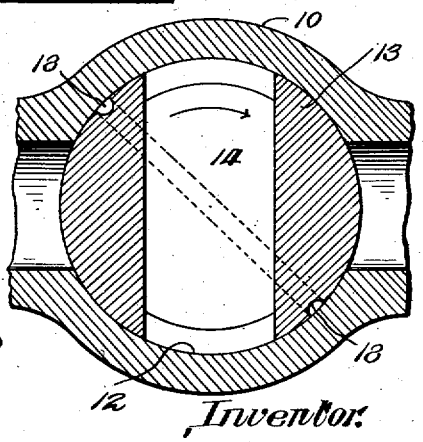
Fig. 3 is a horizontal section taken approximately on the line 3—3 of Fig. 1.

Referring by numerals to the accompanying drawings, 10 designates the body or casing of the cock, the same being provided with oppositely arranged internally threaded tubular portions, 11, for pipe connections, and centrally arranged within the body or casing is a conical valve seat, 12.

Fitting snugly within the valve seat and adapted to rotate therein is a conical plug, 13, having a diametrically arranged opening, 14, that is adapted to register with the openings through the tubular members, 11, and formed integral with and projecting upwardly from the body of the plug is a short cylindrical stem, 15.

Projecting upwardly from the top of this stem, 15, is an externally threaded stem portion, 16, and projecting upwardly from the upper end thereof is a square or non-circular member, 17, that is adapted to receive a valve operating member such as a hand lever or wrench.

Formed in the outer face of the body of plug 13, are diametrically opposed vertically disposed grooves, 18, the lower ends of which terminate in a plane slightly above the lower end of the plug. The upper ends of these lubricant receiving grooves communicate with the ends of a diametrically arranged duct or passageway, 19, the latter being formed through the upper portion of the plug, 13, and this duct or passageway, 19, intersects the lower end of an axially disposed duct or passageway, 20, that is formed through stem, 15, threaded member, 16, and the angular portion, 17, of the stem.

The ducts or passageways just described provide means for delivering lubricant, such as grease or heavy oil, directly to the conical valve seat, 12, and the external surface of plug, 13, said lubricant being delivered into the upper end of duct or passageway, 20, through the check valve, 21, by means of a grease gun 21[a], the lubricant being retained in the ducts or passageways after the removal of the grease gun 21[a] by the check valve, 21.

Grooves, 18, are disposed on the surface of plug, 13, so that if said plug is shifted from closed to open position and vice versa, said passages will at no time register or communicate with the openings through the tubular portion, 11, of the valve housing thus holding the grease or liquid lubricant effectually within said grooves, and as the lubricant is also kept from passing out of its inlet by the check valve, 21, proper lubrication to the plug and plug seat surfaces is assured at all times.

The top housing, 10, surrounding the conical opening, 12, is provided with a relatively flat surface, 22, and positioned thereupon is the outer portion of a diaphragm, 23, that is perforated or provided with a centrally arranged opening for accommodation of the stem, 15.

Positioned immediately on top of diaphragm, 23, is a plate, 25, the same being secured to the casing, 10, in any suitable manner, preferably by means of bolts or studs, 26, and nuts, 27, and formed in the center of this plate is an opening, 28, for the accommodation of the stem, 15.

Formed on the under side of plate, 25, around the centrally arranged opening therein is an annular recess, 29. Arranged within this recess and resting upon the inner edge of the diaphragm, 23, is an annular plate, 30, provided adjacent to its inner edge with an upwardly projecting rib or flange, 31, which latter serves as a bearing for the inner lower edge of a resilient member, preferably a dished metal ring, 32.

When the parts of the cock are properly assembled and nuts, 27, are tightened to secure plate, 25, on housing, 10, the pressure on the outer upper edge of the resilient pressure member, 32, imparts downward pressure to ring or annular plate, 30, and this pressure is transmitted directly to the inner edge of the diaphragm, 23, and as a result a movable fluid pressure tight joint is maintained between the inner surface of the diaphragm and the end of plug, 13. Diaphragm, 23, also provides a joint between the plate, 25, and housing, 10.

Figure 4:
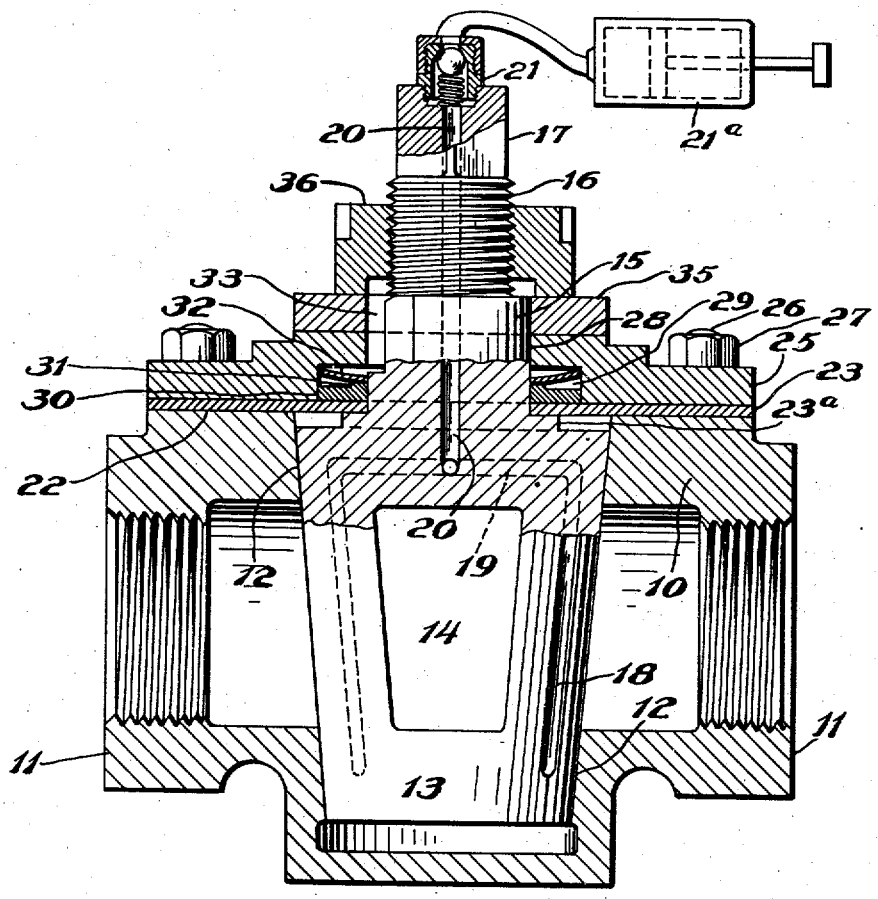
Fig. 4 is a vertical section of a plug cock showing a modification.

The diaphragm, 23, may be constructed of any suitable material; for instance, rubber, duck, asbestos, lead or copper, as best adaptable to the character of service in which the valve is applied. A packing ring or washer 24 is shown interposed between the top of the plug and the underside of the diaphragm; however, this ring may or may not be used depending upon the character of service the valve will operate under, and the underside of the diaphragm may bear directly on a seat made on the end of the plug, the principal feature in making the tight joint against the end of the plug being to have a diaphragm sufficiently flexible to permit the resilient member back of same to bring the diaphragm against a joint surface to prevent leakage across the end of the plug. The modified form of diaphragm which bears directly on the plug is shown in Fig. 4. The upper surface of this plug in this instance is provided with a projecting portion 23*a* upon which the diaphragm seats, the joint ring 24 being omitted.

Formed in the upper portion of stem, 15, is a horizontally disposed arcuate slot or recess, 33, the length of which is slightly greater than ninety degrees, and projecting into said slot or recess from the adjacent inner edge of plate, 25, is a lug, 34.

The parts just described are arranged so that lug, 34, occupies a position at one end of the slot or recess when the valve is in fully closed position, and when said valve is rotated a quarter of a turn into full open position, said lug is positioned in the opposite end of said slot or recess.

Positioned on top of plate 25, around the upper portion of stem, 15, is an auxiliary plate, 35, that is carried by stem, 15, in any suitable manner, and screw seated upon the threaded portion of member, 16, is a nut, 36, the under side of which bears directly on top of plate, 35, thus holding the various movable parts of the valve in proper assembled relation.

In the operation of my improved valve it is only necessary to engage the angular upper end, 17, of the stem with a suitable handle or tool and rotate the plug, 13, so as to open or close the passageway through the housing, 10, or into position to control the flow of fluid through said housing. At all times the resilient member, 32, exerts constant pressure on the inner portion of the diaphragm to maintain a fluid tight joint between the plug and the plate, 25, and which latter serves as a closure for the end of the valve housing and retains the plug in proper operative position within said housing.

The resilient member 32 permits the valve to be raised off its seat when lubricant is introduced under pressure between the surfaces of contact of the plug and casing. The member 32 normally exerts pressure upon the annular plate 30, in turn exerting pressure upon the diaphragm 23 and portion 24, thereby yieldingly resistently maintaining the valve plug on its seat.

While the improvements herein set out are shown and described in connection with a plug cock in which the plug is rotatably held in the plug seat against vertical movement by a plate secured to the body of the cock which takes the thrust and prevents forcing the plug in the plug seat, it is obvious that these improvements are equally applicable to any plug cock which is arranged with lubricant passages which terminate against two seated valves, namely, the plug against the plug seat on the one end and the check valve against its seat on the other end, the same purposes being served by the invention whether the plug be seated upwardly with the large diameter of the taper at the bottom or downwardly with the small diameter of the taper at the bottom as when the cock is set in normal operating position in a pipe line, as shown in Fig. 1. In the practice of my invention I desire it to be understood that when lubricant is introduced between the plug and plug seat surfaces and the plug turned to smear it over the seating surfaces that the plug is seated in a film of lubricant, a fluid tight joint being made by the lubricant, and that as the film is exhausted the plug is finally seated against its metallic seat in the body. During the time that the lubricant film remains between plug and seat the conical metallic surfaces of same are slightly separated, permitting the pressure of the fluid flow through the cock to be transmitted against the lubricant film into the lubricant passages and against the check valve of the filling inlet. In service, upon the exhaustion of the lubricant by movement of the plug in the seat or temperature of the fluid in the cock melting it, for example, or any reason causing the dissipation of the lubricant, the check valve in the lubricant filling inlet is called upon, in case of leakage between the metallic surfaces of plug and seat, to prevent the escape of pressure which enters the lubricant passages and filling inlet at that time so that a new supply of lubricant can be introduced and ready attachment of the lubricant compressor or gun made without the hazard of leakage, which is particularly offensive when the cock is used in steam, gas and acid service.

It will be readily understood that minor changes in the size, form and construction of the various parts entering into my improvements may be made and substituted for those herein shown and described without departing from the spirit of the invention.

What I claim is:—

1. In a plug cock, a casing having a plug seat, a plate affixed to the casing, a diaphragm between the plate and the casing, a plug seated in the casing and rotatably and adjustably held by the plate against vertical movement and resilient means for seating the diaphragm against the plug, lubricant passages between the plug and plug seat surfaces, a lubricant filling inlet communicating with said passages and a check valve in the filling inlet.

2. In a plug cock, a casing having a plug seat, a plate affixed to the casing, a diaphragm between the plate and the casing, a plug seated in the casing and rotatably held by the plate against vertical movement, a joint ring between the diaphragm and the end of the plug and resilient means for seating the diaphragm against the ring.

3. In a plug cock, a casing having a plug seat, a plate affixed to the casing, a diaphragm between the plate and the casing, a plug seated in the casing and rotatably and adjustably held by the plate against vertical movement, a joint ring between the diaphragm and the end of the plug and resilient means for seating the diaphragm against the ring.

4. In a plug cock, a casing having a plug seat, a plate affixed to the casing, a diaphragm between the plate and the casing, a plug seated in the casing and rotatably held by the plate against vertical movement, a joint ring between the diaphragm and the end of the plug, resilient means for seating the diaphragm against the ring, lubricant passages between the plug and plug seat surfaces, a lubricant filling inlet communicating with said passages and a check valve in the filling inlet.

5. In a valve structure, the combination of a casing and a valve element seated therein, a cover for the casing, a flexible element clamped between the casing and the cover and engaging the valve element, an annular washer disposed within a recess in said cover and surmounting the flexible element, means within said cover and engaging said washer for seating the latter upon the flexible element, and means for forcing lubricant between the valve element and its seat.

6. In a valve structure, the combination of a casing and a valve element seated therein, said valve element having an operating stem, a cover for the casing, a flexible element clamped between the casing and the cover and engaging the valve element, an annular washer disposed within a recess in said cover and surmounting the flexible element, means within said cover and engaging said washer for seating the latter upon the flexible element, means adjustable with respect to the valve stem and operable on the cover to move the valve element longitudinally of its seat, and means for forcing lubricant between the valve element and its seat to urge said valve element in a longitudinal direction independently of the adjustable means.

7. In a valve structure, the combination of a casing and a rotatable valve element seated therein, an operating stem extending from said valve member, a cover for the casing, a diaphragm clamped between the casing and the cover and overlying the valve element, a washer surmounting the diaphragm, and means for exerting pressure on said washer to thereby seat the diaphragm against the valve element.

8. In a valve structure, the combination of a casing and a rotatable valve member seated therein, a cover for the casing, a diaphragm clamped between the casing and the cover and overlying the valve member, and a packing ring interposed between and engaging the diaphragm and the valve member and spaced from the casing.

9. In a plug valve structure the combination of a casing and a rotatable plug valve element seated therein, a cover for said casing, a flexible element clamped between said casing and cover, means engaging said flexible element to resiliently seat it upon the valve element, and means for lifting said valve element from its seat against the action of said seating means.

10. In a plug valve structure the combination of a casing and a rotatable plug valve element seated therein, a cover for said casing, a flexible element clamped between said casing and cover, means engaging said flexible element to resiliently seat it upon the valve element, said valve element being provided with an operating stem passing through said cover, and means mounted upon said cover and operating upon said stem to lift said valve element from its seat.

11. In a lubricated plug valve, a casing having a tapered valve seat and a tapered rotatable valve member engaging said seat, a cover for the casing, a stem extending from the valve member through said cover and defining a shoulder on said valve member, a diaphragm clamped between the casing and the cover and overlying said shoulder, means for resiliently seating the diaphragm against said shoulder, and means for introducing lubricant under pressure to said valve seat.

JESSE C. MARTIN, Jr.